428-919 SR
PM014 XR 4,023,179

United States Patent [19]

[11] 4,023,179
[45] May 10, 1977

Ikrath et al.

[54] CAMOUFLAGE VHF ANTENNA

[75] Inventors: Kurt Ikrath, Elberon; William Kennebeck, Sea Bright, both of N.J.; Edward C. Shaffer, Augusta, Ga.

[73] Assignee: The United States of America as represented by the Secretary of the Army, Washington, D.C.

[22] Filed: Oct. 8, 1975

[21] Appl. No.: 620,687

[52] U.S. Cl. .......... 343/713; 343/767
[51] Int. Cl.[2] .......... H01G 13/10
[58] Field of Search .......... 343/767, 768, 769, 711, 343/712, 713

[56] References Cited

UNITED STATES PATENTS

| | | | |
|---|---|---|---|
| 2,575,471 | 11/1951 | Schweiss | 343/712 |
| 2,859,441 | 11/1958 | Rosenbaum | 343/712 |
| 3,056,130 | 9/1962 | Charman | 343/767 |

*Primary Examiner*—Craig E. Church
*Attorney, Agent, or Firm*—Nathan Edelberg; Jeremiah G. Murray; Frank J. Dynda

[57] ABSTRACT

A camouflaged VHF military antenna is formed from the slot which is created when the door of a pick-up truck having a metal shelter thereon is left partially ajar.

4 Claims, 3 Drawing Figures

CAMOUFLAGE VHF ANTENNA

GOVERNMENT LICENSE

The invention described herein may be used by or for the Government for governmental purposes without the payment of any royalties thereon or therefor.

BACKGROUND OF THE INVENTION

1. Field of the Invention

Broadly speaking, this invention relates to antennas. More particularly, in a preferred embodiment, this invention relates to a camouflaged slot antenna for use at VHF frequencies.

2. Discussion of the Prior Art

The tactical need for low profile or camouflaged antennas on vehicles has been clearly demonstrated during recent military conflicts. Whip antennas can easily be sighted and destroyed by enemy fire, thereby preventing the vehicles personnel from communicating and coordinating with other friendly elements. The vulnerability of conventional whip antennas on tanks, personnel carriers, communications trucks and other vehicles has limited the combat effectiveness of forward units in battle.

Another problem is that most vehicles requiring camouflage are employed by the lower echelons which, at the present time, utilize VHF radio communications networks. Thus, with vehicles communicating at frequencies between 30 MHZ and 80 MHZ, the dimensions of the vehicles are comparable enough to a signal wavelength to make placement of non-conventional, camouflaged, antennas critical.

It is known that in the MF and HF bands, a vehicle or helicopter itself can be used as a large radio antenna rather than as a counterpoise for a conventional whip antenna.

The problem, then, is to devise a camouflaged VHF antenna for a military vehicle, or the like, in which the dimensions of the vehicle assist rather than hinder propagation.

SUMMARY OF THE INVENTION

The above problem has been solved by the instant invention which in a vehicle or the like, having at least one cavity the dimensions of which are comparable to the half-wavelength of the frequency of interest, comprises a VHF antenna formed by the slot created by the partial opening of a door or hatch into said cavity, said antenna further including means for coupling a r.f. energy into the slot and at least one means for tuning the slot thereby to achieve a desired radiation pattern at the frequency of interest.

The invention and its mode of operation will be more fully understood from the following detailed description, when taken with the appended drawings in which:

DETAILED DESCRIPTION OF THE INVENTION

The invention will now be described with reference to a military ¾ ton truck. One skilled in the art will appreciate that the invention is not so limited and, with appropriate modifications, may be used equally well with tanks, personnel carriers, aircraft, etc. and with civilian vehicles such as police and fires trucks and the like.

The instant invention is based on the realization that the dimensions of the three open sides of the metal shelter on a ¾-ton truck were on the order of half the wavelength of a 60 MHZ signal ($\sim 130 \times 6 \times 60$ cm). This, in turn, led to the realization that a 2 to 5 cm wide slot in the form of a tapered gap between the door frame and the slightly opened door of the shelter would act like a slot antenna backed by a cavity (the metal shelter).

Figure 1:
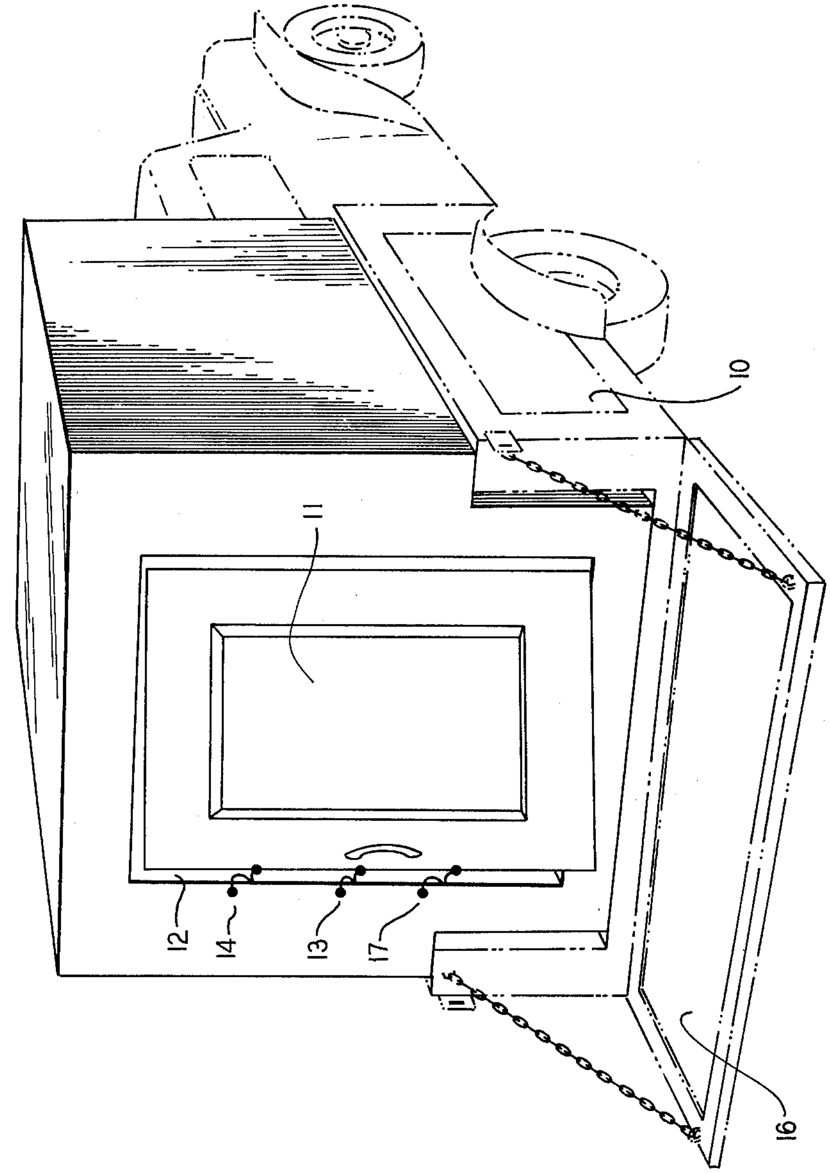
FIG. 1 is a partial, isometric end view of an illustrative door slot antenna according to the invention.

FIG. 1 depicts the outside view of a truck 10 with a door 11 partially open thereby to define a slot 12.

To test the concept that slot 12 could act as an antenna two holes were drilled at the center of the vertical edge of the opened door and door jamb, and terminals were implanted. These holes are designated 13—13 in FIG. 1. A preliminary impedance measurement conducted from outside the truck with the gate 16 down revealed a resonance at 44 MHZ with an impedance of 400 ohms. The impedance matching problem suggested implanting two additional holes for terminals arbitrarily placed at 37 cm above the center terminal. These second holes are designated 14—14 in FIG. 1.

Tests were conducted with and without a tuning circuit connected across the upper terminals. These tests showed that the use of a ferrite balun above (on the cneter terminals) for impedance matching was responsible for loss of transmission efficiency. The impedance matching was responsible for loss of transmission efficiency. The impedance matching was improved by placing a tuning circuit across the two upper terminals of the doorslot while feeding the signal into the two center terminals. Experiments with this setup resulted in the discovery that signal strength improved appreciably by raising the tailgate of the truck. Signal strengths measured at locations on all four sides of the truck pointed to a definite radiation pattern. These initial tests resulted in signal strengths consistently approaching the same order of radiation achieved with a whip antenna.

The above results were so encouraging that further tests were conducted. An impedance measurement of the doorslot antenna without the tuning circuit was made from inside the shelter with the tailgate raised. Comparison of the impedance of the doorslot with some previous, inconclusive experiments made using a 10 coil coupler demonstrates that the doorslot has series as well as parallel resonances, and more resistive impedance components than the coupler. This indicated that the doorslot could be more readily tuned and matched than the coupler. A third set of teminals, 17—17, in FIG. 1 was implanted in the door and door jamb, this time ~37 cm below the center terminals. It was thought that by connecting a tuning circuit across the opening here as well as above the center terminals, more effective control of the radiating currents traveling along the slot could be obtained.

Figure 2:
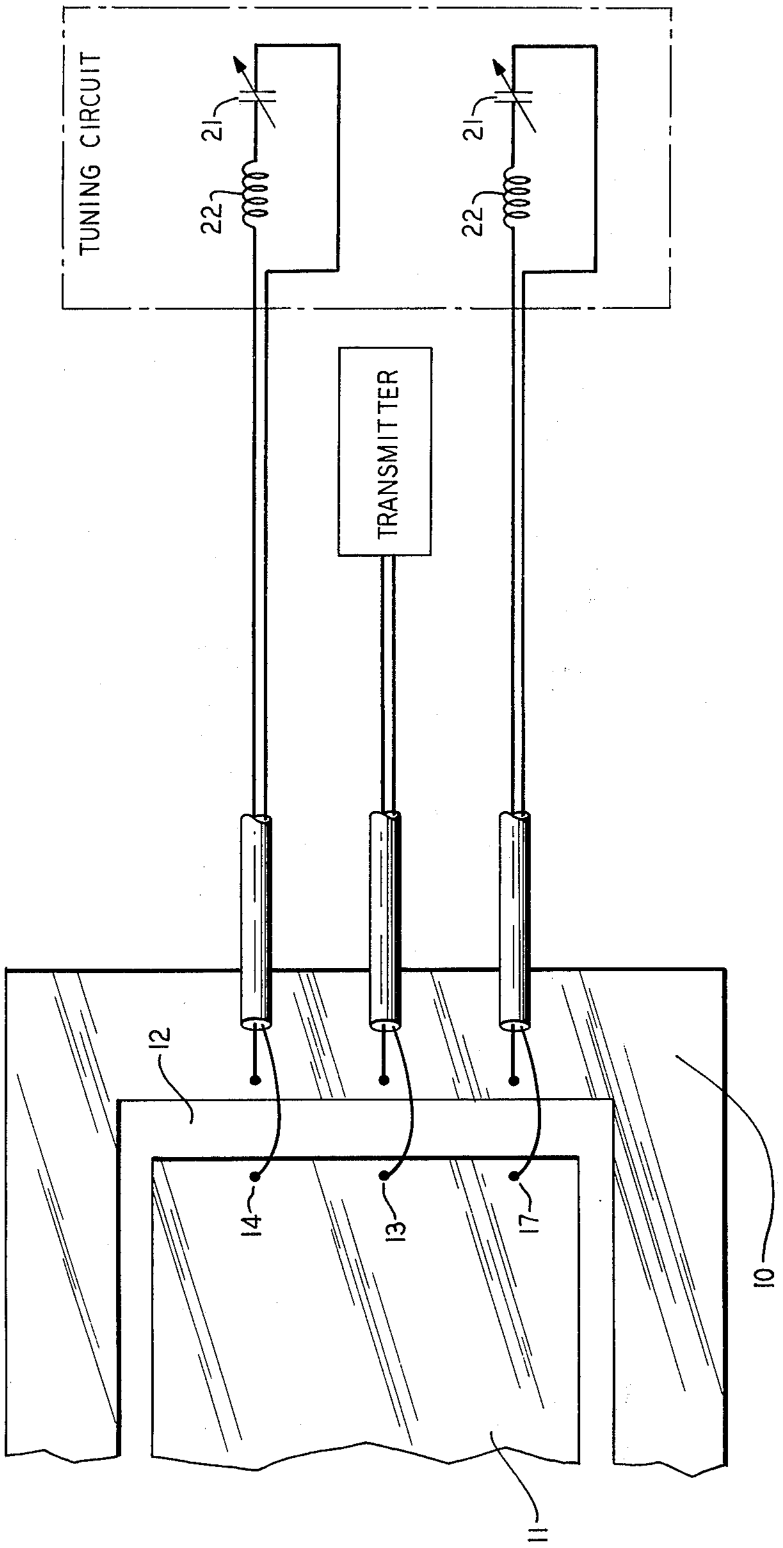
FIG. 2 is a partially schematic partially diagramatic view of the slot antenna shown in FIG. 1 depicting the connection of the load and tuning apparatus thereto.

As shown in FIG. 2, a capacitor 21 and inductor 22 connected in series across tuning points 17—17 as well as at the previous tuning points 14—14 were used. With both tuning circuits placed in the same box and connected to the door by means of 1-meter long coaxial cables and the doorslot fed at the center point by a 50-ohm source, a bandwidth of 47 to 61 MHZ was obtained. It is probable that a wider frequency range could be obtained by choosing different tuning points along the doorslot.

A voice communications test was made using the doorslot antenna. The mobile station used was a ¾-ton truck with the doorslot antenna fed by a suitable transmitter inside the metal shelter.

The doorslot antenna was found to be effective over at least a 7-mile range. It was observed that communication was more affected by local features than by the directivity of the truck's radiation. A loss in strength and clarity resulted when the truck was near large buildings, power lines and a bridge. The antenna worked best in open areas and when the truck was stopped. These effects were not unexpected at VHF.

Figure 3:
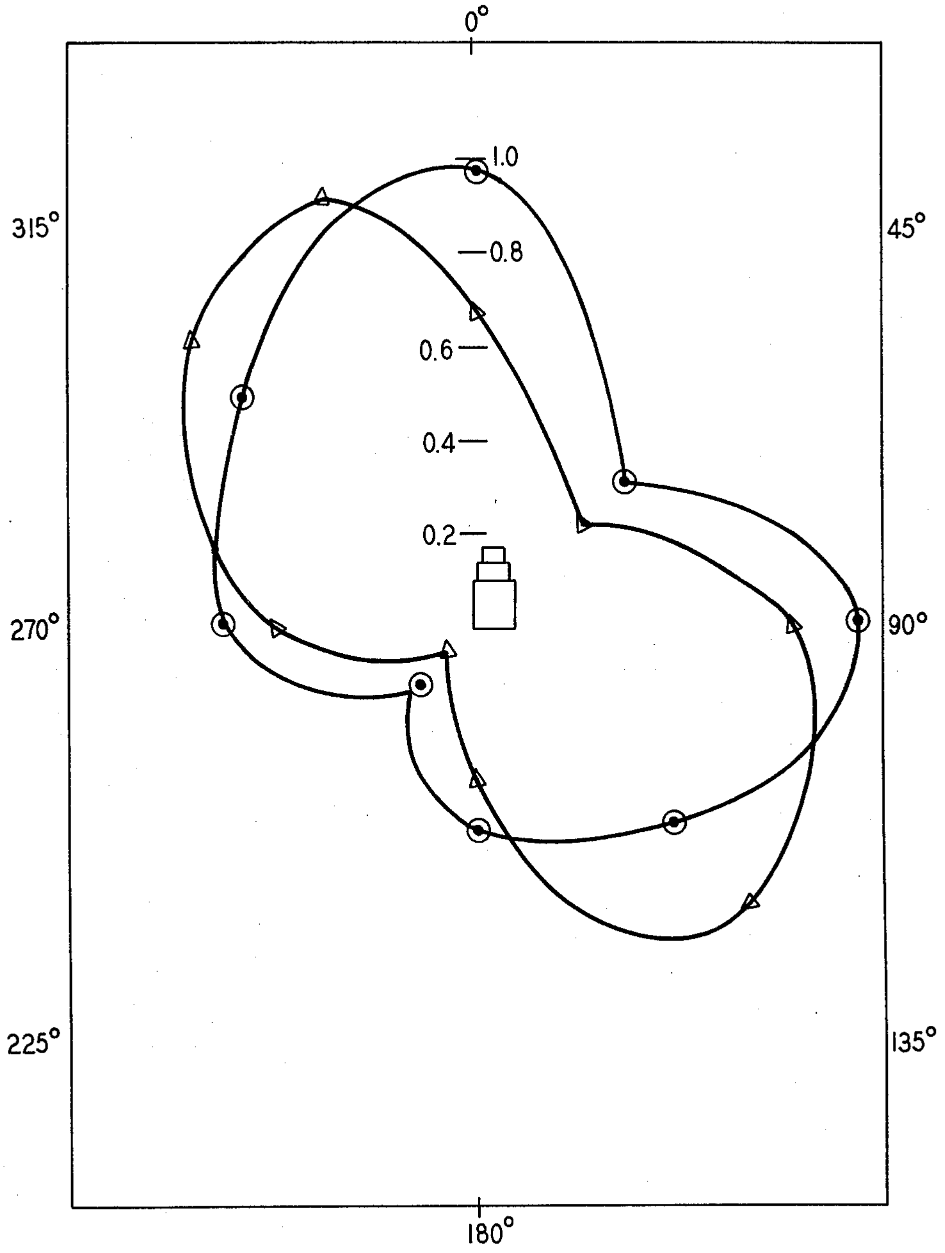
FIG. 3 is a polar diagram depicting the directivity pattern of the antenna shown in FIG. 1.

A directivity pattern was also made. A transmitter with an automatic keyer was used for transmission while a Heterodyne Voltmeter and a Chart Recorder were used for reception at a base location. The ¾-ton truck was driven in a circular pattern at two locations; the position of the vehicle relative to the base station was communicated by means of Transceivers. The resulting patterns are shown in FIG. 3. Notice the consistent nulls and maxima resulting from the surface distribution of the metal shelter and truck. This shows that the principle involved is clearly an effective means of developing a camouflaged VHF antenna and that the doorslot antenna can be more readily tuned over a wide bandwidth than other devices examined.

Of course, the invention is not restricted to doors. Other existing openings, such as the windows and hatches of metal vehicles and aircraft may also be used as slot antennas. A means of filling these openings with an insulating material such that they are physically closed, but electrically open is readily perceived. Such antenna configurations are nearly invisible and practically invulnerable to small arms fire.

A more omnidirectional pattern may be obtained by several means, e.g., by making additional slots or by cutting the edge of the door so that it closes flat, leaving a width of insulating material or an opening. More effective and responsive tuning mechanisms may be devised by cutting an additional slot in the metal surface perpendicular to that used for propagation and shorting across the two slots in various ways.

One skilled in the art can make various changes and substitutions to the arrangement of parts shown without departing from the spirit and scope of the invention.

What is claimed is:

1. In a vehicle, or the like, having at least one cavity the dimensions of which are comparable to the half-wavelength of the frequency of interest, a camouflaged VHF antenna which is formed by the slot created by the partial opening of a door or hatch into said cavity, said antenna further including means for coupling radio frequency energy into said slot comprising a source of radio frequency energy; and co-axial cable means connecting said r.f. source to adjacent center points on the vertical door jamb and vertical door edge forming said slot;

at least one means for tuning said slot comprising at least the series combination of a lumped variable capacitor and an inductor; and co-axial cable means connecting said series combination with adjacent points separated from said adjacent center points on the door jamb and door forming said slot thereby to achieve a desired radiation pattern at the frequency of interest.

2. The apparatus according to claim 1 wherein said vehicle is a truck, said cavity is the interior of a walk-in metal shelter carried by said truck and said slot is formed by the door jamb and the edge of the partially opened door into said shelter.

3. The apparatus according to claim 1 wherein said tuning means comprising a series capacitor and inductor is connected to adjacent points at a distance above the rf feed connection and a similar series capacitor and inductor connected to adjacent points the same said distance below the rf feed connection, said adjacent points being on the vertical jamb edge and vertical door edge forming the slot respectively.

4. The apparatus of claim 1 including a tailgate wherein the signal strength is improved by moving the tailgate of the vehicle to a preferred position.

* * * * *